United States Patent

[11] 3,611,149

[72] Inventor Christopher V. Kimball
Ann Arbor, Mich.
[21] Appl. No. 830,964
[22] Filed June 6, 1969
[45] Patented Oct. 5, 1971
[73] Assignee The Bottelle Development Corporation
Columbus, Ohio

[54] ITERATED SWITCHED MODE RECEIVER
10 Claims, 5 Drawing Figs.

[52] U.S. Cl. .......... 325/323, 235/181, 325/473, 325/474, 325/477, 333/70 R
[51] Int. Cl. .......... H04b 1/10
[50] Field of Search .......... 324/77 H; 325/42, 321, 322, 323, 324, 473, 474, 475, 47 L, 477, 65; 333/70 T; 235/181

[56] References Cited

UNITED STATES PATENTS 3,268,836 8/1966 Linke .......... 235/181
3,270,188 8/1966 Ares .......... 235/181
3,484,547 12/1969 Schaeffer .......... 325/42

*Primary Examiner*—Robert L. Griffin
*Assistant Examiner*—Albert J. Mayer
*Attorney*—Sughrue, Rothwell, Mion, Zinn & Macpeak

ABSTRACT: There is disclosed an iterated switched mode receiver which operates on a received distorted serial binary sequence to diminish or eliminate inter symbol interference. The operation of the receiver is predicated upon making two decisions on each symbol. The preliminary or "first guess" decisions on adjacent symbols are used to eliminate the effects of these symbols on the final decision for each symbol. Signal delays are employed so that it is possible to work with the successor digit as well as the predecessor digit. The preliminary decisions on the succeeding and preceding digits are made by threshold circuit having thresholds at zero. The final decision is made by a variable threshold circuit which receives as its inputs outputs representative of the digit immediately preceding, the digit immediately succeeding and the digit to be processed.

| | |
|---|---|
| $L_{k\pm1} \geq 0$ | $d^0_{k\pm1} = +1$ |
| $L_{k\pm1} < 0$ | $d^0_{k\pm1} = -1$ |

| $d^0_{k+1}$ | $d^0_{k-1}$ | $L_k$ | $d_k$ |
|---|---|---|---|
| +1 | +1 | ≥ 2R(T) | +1 |
| +1 | +1 | < 2R(T) | −1 |
| +1 | −1 | ≥ 0 | +1 |
| +1 | −1 | < 0 | −1 |
| −1 | +1 | ≥ 0 | +1 |
| −1 | +1 | < 0 | −1 |
| −1 | −1 | ≥ −2R(T) | +1 |
| −1 | −1 | < −2R(T) | −1 |

INVENTOR
CHRISTOPHER V. KIMBALL

BY Sughrue, Rothwell, Mion, Zinn & Macpeak
ATTORNEYS

ITERATED SWITCHED MODE RECEIVER

BACKGROUND OF THE INVENTION

1. Field of the Invention

This invention relates generally to binary communication systems, and more particularly to a nonlinear receiver which has as its basic purpose the reconstitution or recovery of binary digital information from a distorted and noisy version of that information. More specifically, this subject invention acts to diminish or eliminate interference for a given digit caused by both its immediate predecessor and its immediate successor in a serial binary sequence.

2. Description of the Prior Art

It is well recognized from substantive work that efficient communication of information can take place when the information, Whatever its original form, is converted to a binary presentation. For example, instead of sending a voice signal in the continuous manner in which it was generated by a speaker, various electronic operations can be performed upon the voice signal, whereupon the signal is converted to a sequence of zeros and ones, so that it might appear in coded form as

1001101011011000010101101010110

A sequence such as that above is called hereinafter a serial binary sequence.

Let it be supposed that a single serial binary sequence is transmitted using, for example, electrical signals to represent the zeros and ones. This transmitted sequence will then pass through some intervening medium, such as air, wire, coaxial cable, waveguides or the like, before it reaches the receiving station. During the transmission, the physical characteristics of the signals change for two principle reasons. First, there will be unwanted information added to the signal because of other sources in the vicinity of the transmission path. Such additions are referred to as noise. Second, the signal is distorted by the medium. For the example, if the transmission medium or for that matter the transmitting and receiving circuits do not have sufficient bandwidth, the transmitted signal will be spread in time resulting in intersymbol interference in the binary sequence. As a consequence, the signal received at the receiving station does not lend itself to a ready reconstitution of the transmitted signal. More specifically, as received, the signal cannot be immediately decoded into a sequence of zeros and ones.

The traditional methods of dealing with the intersymbol interference and noise problem are spectrum equalization or transversal equalization. It has been found that the spectrum equalization technique is not really effective in reducing the effects of intersymbol interference in a communication system. In a transversal filter receiver, one must trade noise performance and intersymbol interference performance against each other in order to obtain the best overall system error performance. In other words, the transversal filter receiver while effective in eliminating intersymbol interference in the absence of noise becomes less so as the signal to noise ratio becomes smaller. Often these earlier approaches to the problem require the use of an analog tapped delay line of length equal to several symbol durations and required critical adjustments.

SUMMARY OF THE INVENTION

It is therefore an object of the present invention to provide a nonlinear receiver which operates on a received serial binary sequence with intersymbol interference and noise with a low probability of error.

It is another object of the invention to provide a nonlinear receiver which has as its basic purpose the reconstitution or recovery of binary digital information from a distorted and noisy version of that information.

It is a further object of the instant invention to provide a receiver in a binary communication system which provides nearly ideal performance with ease of implementation and low system cost.

According to the present invention, the foregoing and other objects are attained in one embodiment by providing two delay circuits connected in cascade. The delay circuits each provide a time delay equal to one digit interval. There are three outputs from the cascaded delay circuits, one at the input of the first delay circuit, e at the junction of the two delay circuits and one at the output of the second delay circuit. The first output is connected to a first decision circuit having a threshold at zero. The output of the first decision circuit provides a representation to a first approximation of the digit immediately succeeding the digit which is to be processed. The third output is connected to a similar second decision circuit having a threshold at zero. The output of the second decision circuit is representative to a first approximation of the digit immediately preceding the digit to be processed. The digit to be processed is available at the second output. The final decision is made by a variable threshold circuit which receives as its inputs the outputs representative of the digit immediately preceding, the digit immediately succeeding and the digit to be processed. In a second embodiment, the invention is implemented without using any analog delay devices. Instead, digital delay devices can be used in conjunction with conventional logic circuitry.

BRIEF DESCRIPTION OF THE DRAWINGS

The specific nature of the invention, as well other objects, aspects, uses and the advantages thereof, will clearly appear from the following description and from the accompanying drawings, in which.

DESCRIPTION OF THE PREFERRED EMBODIMENTS

Figure 1:
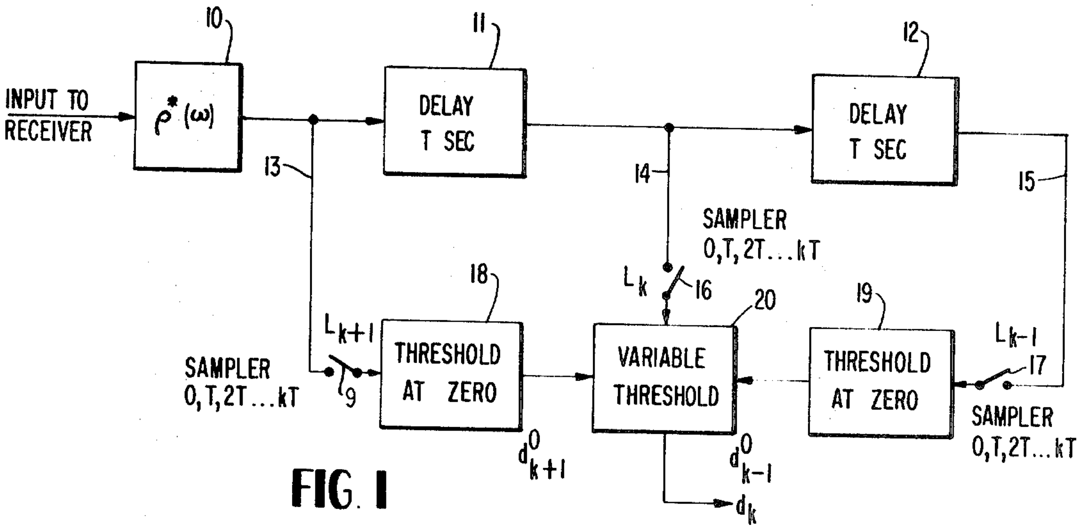
FIG. 1 is a block diagram illustrating one embodiment of the invention.

Referring now to the drawings and more particularly to FIG. 1 thereof, there is shown one embodiment of the iterated switched mode receiver which uses two analog delay lines each of duration equal to that of a transmitted symbol. Let the transmitted symbol have a duration T seconds and let $\rho(t)$ be the noise-free received waveform of a single symbol of value +1. Let $\rho(\omega)$ be the Fourier transform of $\rho(t)$ and let $\rho^*(\omega)$ be the complex conjugate of $\rho(\omega)$. Furthermore, let $R(T)$ be the autocorrelation function of $\rho(t)$ evaluated at time $t$=T.

Given these conditions, the iterated switched mode receiver shown in FIG. 1 comprises a matched filter 10 which receives the input signal to the receiver. As is well known in the art, a matched filter has a transfer function $\rho^*(\omega)$ which is the complex conjugate of the transform of a single symbol. The output of the matched filter 10 is connected to a first analog delay line 11 which is in turn connected to a second analog delay line 12. Each of the delay lines 11 and 12 provide a delay of T seconds. Three outputs are available from the circuitry thus far described: one at the input to the first delay line 11 denoted by 13; one at the junction of the delay lines 11 and 13 denoted by 14; and the third at the output of delay line 12 denoted by 15. The signal at output 14 may be represented by the symbol $L_k$ which is the decision variable for the kth symbol. $L_{k+1}$ and $L_{k11}$ at outputs 13 and 15, respectively, represent the decision variables for the symbols immediately adjacent the kth symbol. Each of the outputs 13, 14, and 15 are connected to respective samplers, 9, 16 and 17. The samplers sample at times O, T, 2T...$k$T. In the alternative, a single sampler could be provided at the output of matched filter 10 immediately preceding output 13. The outputs of samplers 9 and 17 are connected to the inputs of respective threshold at zero devices 18 and 19.

Figure 2:
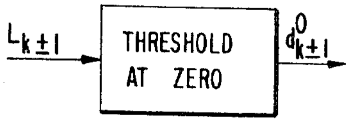
FIG. 2 illustrates the functional properties of the threshold at zero devices shown in FIG. 1.

FIG. 2 illustrates the operation of the threshold at zero devices 18 and 19. If the input decision variable is greater than or equal to zero, then the preliminary or "first guess" decision output of the threshold at zero device will be a +1. On the other hand, if the input decision variable is less than zero, then the "first guess" decision output of the device will be −1. The threshold at zero decision devices are realized in terms of the conventional Schmitt trigger circuit. See, for example, Millman and Taub, *Pulse, Digital and Switching Waveforms*, McGraw-Hill, 1965, at pages 389 to 394. Thus, a "threshold at B" circuit is simply a Schmitt trigger with trigger levels set to B. That is, the Schmitt trigger has a logical one output if the input level is greater than or equal to B, and gives a logical zero output otherwise. The threshold at zero decision device is therefore simply a Schmitt trigger with a zero trigger level.

Figure 3:
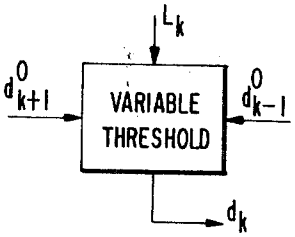
FIG. 3 illustrates the functional properties of the variable threshold device shown in FIG. 1.

Returning now to FIG. 1, the output of the sampler 16 is connected to one input of a variable threshold decision device 20. Variable threshold decision device 20 also receives as inputs the outputs of threshold at zero devices 18 and 19. Thus, the variable threshold device receives as inputs $L_k$, $d^0_{k+1}$, and $d^0_{k11}$FIG. 3 shows the operation of the variable threshold device 20. For example, if the preliminary or "first guess" decisions for each of the adjacent symbols is +1 and the decision variable for the *k*th symbol is greater than or equal to 2R(T) then the final decision on the *k*th symbol is +1. The other possible combinations will be apparent from an examination of the table in FIG. 3. The variable threshold decision device can be easily implemented using Schmitt triggers and digital logic.

Figure 4:
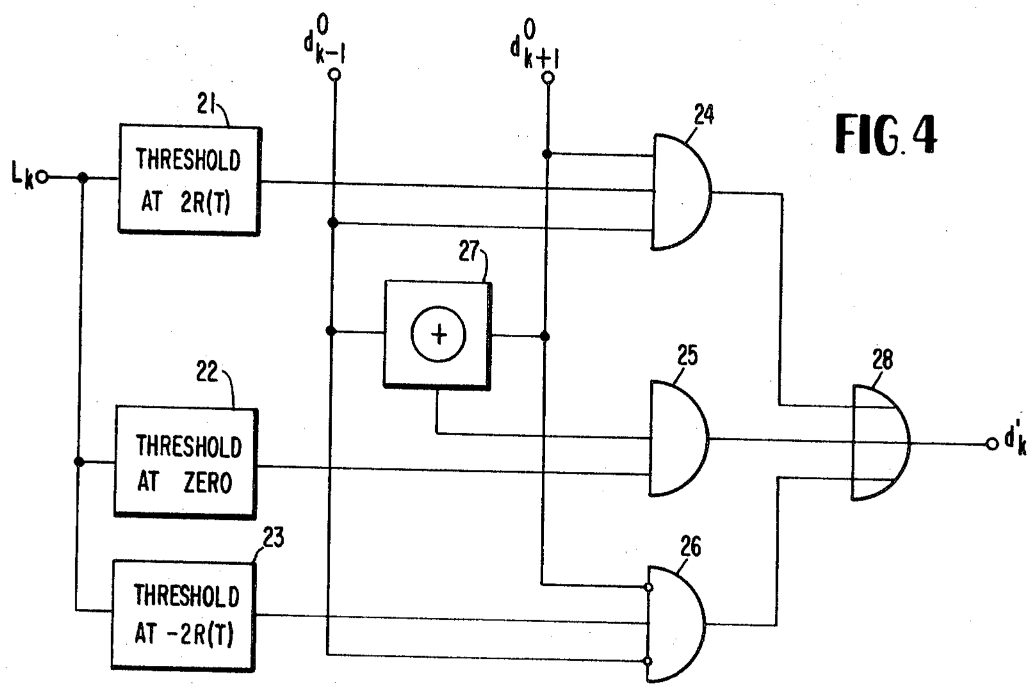
FIG. 4 is a logical diagram illustrating one form of variable threshold device that could be used in the system shown in FIG. 1.

One possible implementation of the variable threshold decision device is illustrated in FIG. 4. In this implementation there are three Schmitt triggers 21, 22 and 23 all having a common input denoted by $L_k$. Schmitt trigger 21 has a threshold at 2R(T), while Schmitt triggers 22 and 23 have threshold levels at zero and −2R(T), respectively. The outputs of each of the Schmitt triggers 21, 22 and 23 are coupled to respective AND gates 24, 25 and 26. AND gate 24 also receives as inputs the outputs of the threshold at zero decision devices 18 and 19 shown in FIG. 1. The outputs of the decision devices 18 and 19 are also connected to the inhibit inputs of AND gate 26. Finally, these same outputs are combined in a modulo 2 adder or exclusive OR gate 27, the output of which is connected as a second input to AND gate 25. The outputs of AND gates 24, 25 and 26 are all combined in OR gate 28 to provide the final decision on the *k*th symbol.

Referring again to FIG. 3, it will be seen that the implementation of the variable threshold decision device shown in FIG. 4 provides the proper functions. For example, considering the case where the output of threshold at zero device 18 is +1, the output of threshold at zero device 19 is −1, and $L_k$ is greater than or equal to 0, it will be seen that the output of AND gate 25 will be +1 since the exclusive OR gate 27 will produce a +1 output whenever it has only one +1 input. If the outputs of both of the thresholded zero devices 18 and 19 are −1 and $L_k$ is greater than or equal to −2R(T), then AND gate 26 will produce a +1 output. The remaining examples will be apparent on examination of the table in FIG. 3.

Figure 5:
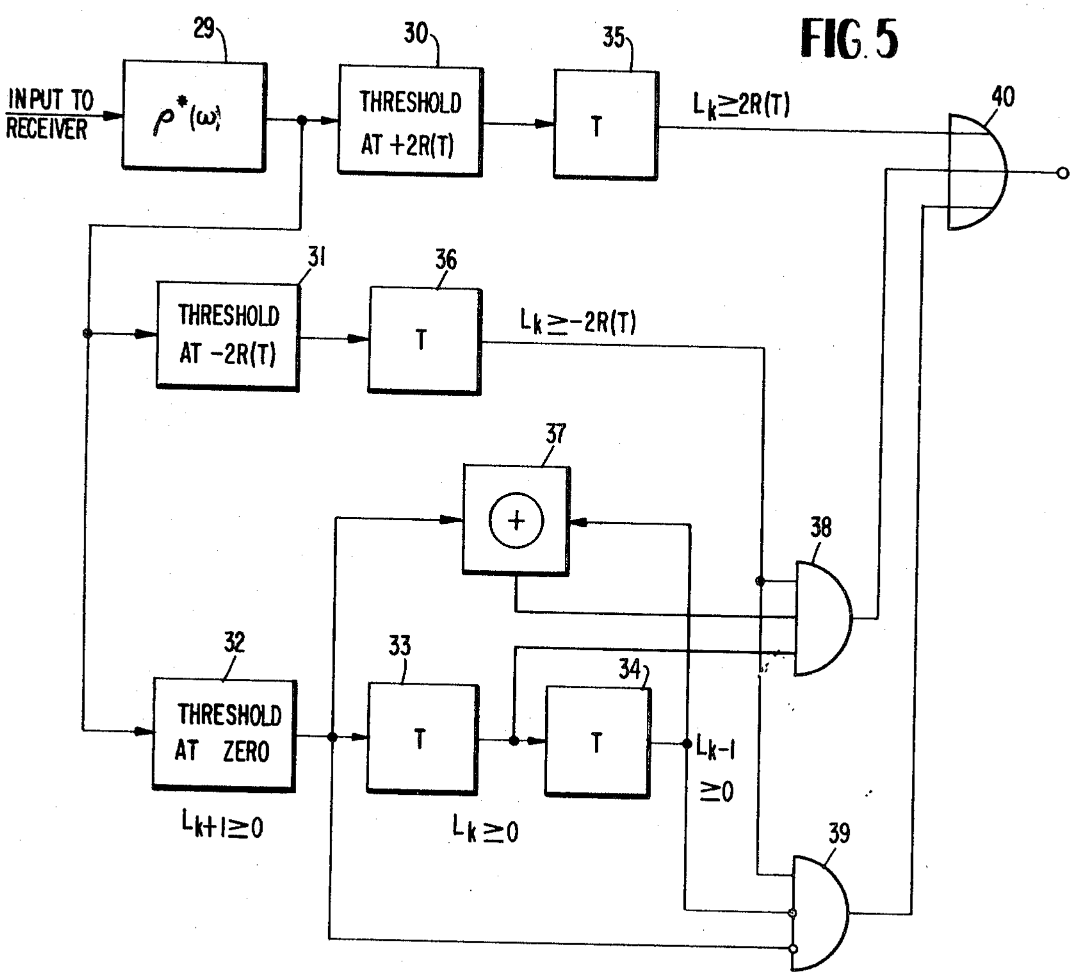
FIG. 5 is a block and logical diagram of another embodiment of the invention which uses digital delay devices.

In an alternative embodiment, the iterated switched mode receiver can be implemented without using any analog delay devices. Instead, digital delay devices such as, for example, flip-flops can be used in conjunction with conventional logic devices. In FIG. 5, the input signal is coupled to a matched filter 29 which is like the matched filter 10 of FIG. 1. The output of matched filter 29 is connected to the inputs of three Schmitt triggers 30, 31 and 32. Schmitt triggers 30 and 31 have thresholds set at +2R(T) and −2R(T), respectively, and Schmitt trigger 32 has its threshold set at zero. The output of Schmitt trigger 32 is connected to the input of a first digital delay device 33 which in turn has its output connected to the input of a second digital delay device 34. The digital delay devices 33 and 34 may be, for example, flip-flops which are connected as shift register stages. As such, device 33 would be set by an output from Schmitt trigger 32 and have its contents shifted out with the next clock pulse (not shown) synchronized with the sampling gate intervals (again not shown). The delay device 34 would be set by an output from device 33 and in a like manner would have its contents shifted out with the next clock pulse. Similar delay devices 35 and 36 are connected to the outputs of Schmitt triggers 30 and 31, respectively.

The output of Schmitt trigger 32 and the output of digital delay device 34 are connected to the inputs of modulo 2 adder or exclusive OR gate 37. The outputs of digital delay devices 33 and 36 and the output of exclusive OR gate 37 are connected as inputs to AND gate 38. AND gate 39 also receives as its input the output of digital delay device 36. The output of Schmitt trigger 32 and the output of digital delay device 34 are connected to the INHIBIT inputs of AND gate 39. The output of digital delay device 35 and the outputs of AND gates 38 and 39 are combined in OR gate 40 to provide the final decision output on the *k*th symbol.

It will be apparent that the embodiments shown are only exemplary and that various modifications can be made in construction and arrangement within the scope of the invention as defined in the appended claims.

I claim:

1. In a binary communication system, an iterated switched mode receiver for processing received binary digital information from a noisy, band-limited transmission medium to diminish or eliminate intersymbol interference from the *k*th digit in a serial binary sequence caused by overlapping of its immediate predecessor and its immediate successor digits, said receiver comprising:
   a. first decision means responsive to the binary digital information for providing an output which to a first approximation is representative of the digit immediately succeeding the *k*th digit in the serial binary sequence,
   b. second decision means for providing an output which to a first approximation is representative of the digit immediately preceding the *k*th digit in the serial binary sequence, and
   c. third decision means for receiving and comparing the output of said first decision means, a signal corresponding to the *k*th digit and the output of said second decision means for providing an output representative of the final decision of the *k*th digit.

2. An iterated switched mode receiver as recited in claim 1 further comprising a matched filter for receiving the binary digital information and providing said signal corresponding to the *k*th digit, and means connecting the output of said filter to the inputs of said first and second decision means.

3. An iterated switched mode receiver as recited in claim 2 first and second delay means connected in series between said filter and said second decision means, said signal corresponding to the *k*th digit being provided at the output of said first delay means.

4. An iterated switched mode receiver as recited in claim 2 wherein the transfer function of said filter is related to the Fourier transform of a single symbol.

5. An iterated switched mode receiver as recited in claim 3 wherein said first and second decision means are Schmitt triggers having thresholds set at zero.

6. An iterated switched mode receiver as recited in claim 5 wherein said third decision means comprises:
   a. first, second and third Schmitt triggers having their inputs connected to the output of said first delay means, said first Schmitt trigger having a threshold at 2R(T), said second Schmitt trigger having a threshold at zero, and said third Schmitt trigger having a threshold at −2R(T) where R(T) is the autocorrelation function of the noise-free received waveform of a single symbol of value +1, at time T, where T is the duration of the transmitted symbol,
   b. an exclusive OR gate receiving as its inputs the outputs of said first and second decision means, c. first and second AND gates, said first AND gate receiving as its inputs the output of said second Schmitt trigger and said exclusive OR gate, and said second AND gate receiving as its input the output of said third Schmitt trigger and also receiving as inhibit inputs the outputs of said first and second decision means, and d. an OR gate receiving as its inputs the outputs of said first and second AND gates and of said first Schmitt trigger.

7. An iterated switched mode receiver as recited in claim 3 wherein said first and second delay means have delays equal to T seconds where T is the duration of a transmitted symbol and further comprising sampling means for sampling the received signal each T seconds.

8. An iterated switched mode receiver as recited in claim 3 wherein said first and second delay means are digital delay devices.

9. An iterated switched mode receiver as recited in claim 3 wherein said first and second delay means are analog delay lines.

10. In a binary communication system, an iterated switched mode receiver for processing received binary digital information from a noisy, band-limited transmission medium to diminish or eliminate intersymbol interference from the *k*th digit in a serial binary sequence caused by overlapping of its immediate predecessor and its immediate successor digits, said receiver comprising:

a. filter means for receiving a signal responsive to said digital information and for providing an output that is a predetermined function of said signal;

b. first decision means responsive to the output of said filter means for providing an output which to a first approximation is representative of the digit immediately succeeding the *k*th digit;

c. delay and second decision means responsive to the output of said filter means for providing an output which to a first approximation is representative of the digit immediately preceding the *k*th digit;

d. delay means responsive to the output of said filter means for providing an output that is representative of the *k*th digit, e. third decision means responsive to a comparison of the outputs of said first decision means, said delay and second decision means, and said delay means, for providing an output representative of the final decision of the *k*th digit;

f. said filter means (a) comprises a matched filter;

g. said first decision means (b) comprises a first Schmitt trigger having a threshold at zero;

h. said delay and second decision means (c) comprises said first Schmitt trigger of (g) and first and second delay means connected in series;

i. said delay means (d) comprises said first Schmitt trigger of (g) and said first delay means of (h) for providing a first output representative of the *k*th digit, a second Schmitt trigger having a threshold at $-2R(T)$ and third delay means for providing a second output representative of the *k*th digit, a third Schmitt trigger having a threshold at $2R(T)$ and fourth delay means for providing a third output representative of the *k*th digit, where R is the autocorrelation function of the noise-free received waveform of a single symbol of value +1, at time $t=T$, where T is the duration of the transmitted symbol; and j. said third decision means (e) comprises (1) an exclusive OR gate receiving as its inputs the outputs of said first Schmitt trigger and of said second delay means, (2) a first AND gate receiving as its input the output of said third delay means and receiving as inhibit inputs the outputs of said first Schmitt trigger and of said second delay means, (3) a second AND gate receiving as its inputs the outputs of said first delay means and of said exclusive OR gate, and (4) an OR gate receiving as its inputs the outputs of said first and second AND gates and of said fourth delay means.